(No Model.) 4 Sheets—Sheet 1.
J. V. STOUT.
ELECTRO MAGNETIC VALVE CONTROLLER.

No. 421,449. Patented Feb. 18, 1890.

Witnesses: Inventor:
Arthur Ashley John V. Stout
James F. Duhamel per [signature] atty.

(No Model.) 4 Sheets—Sheet 2.

J. V. STOUT.
ELECTRO MAGNETIC VALVE CONTROLLER.

No. 421,449. Patented Feb. 18, 1890.

Witnesses:
Arthur Ashley
James F. Duhamel.

Inventor:
John V. Stout (No Model.) 4 Sheets—Sheet 3.
J. V. STOUT.
ELECTRO MAGNETIC VALVE CONTROLLER.
No. 421,449. Patented Feb. 18, 1890.
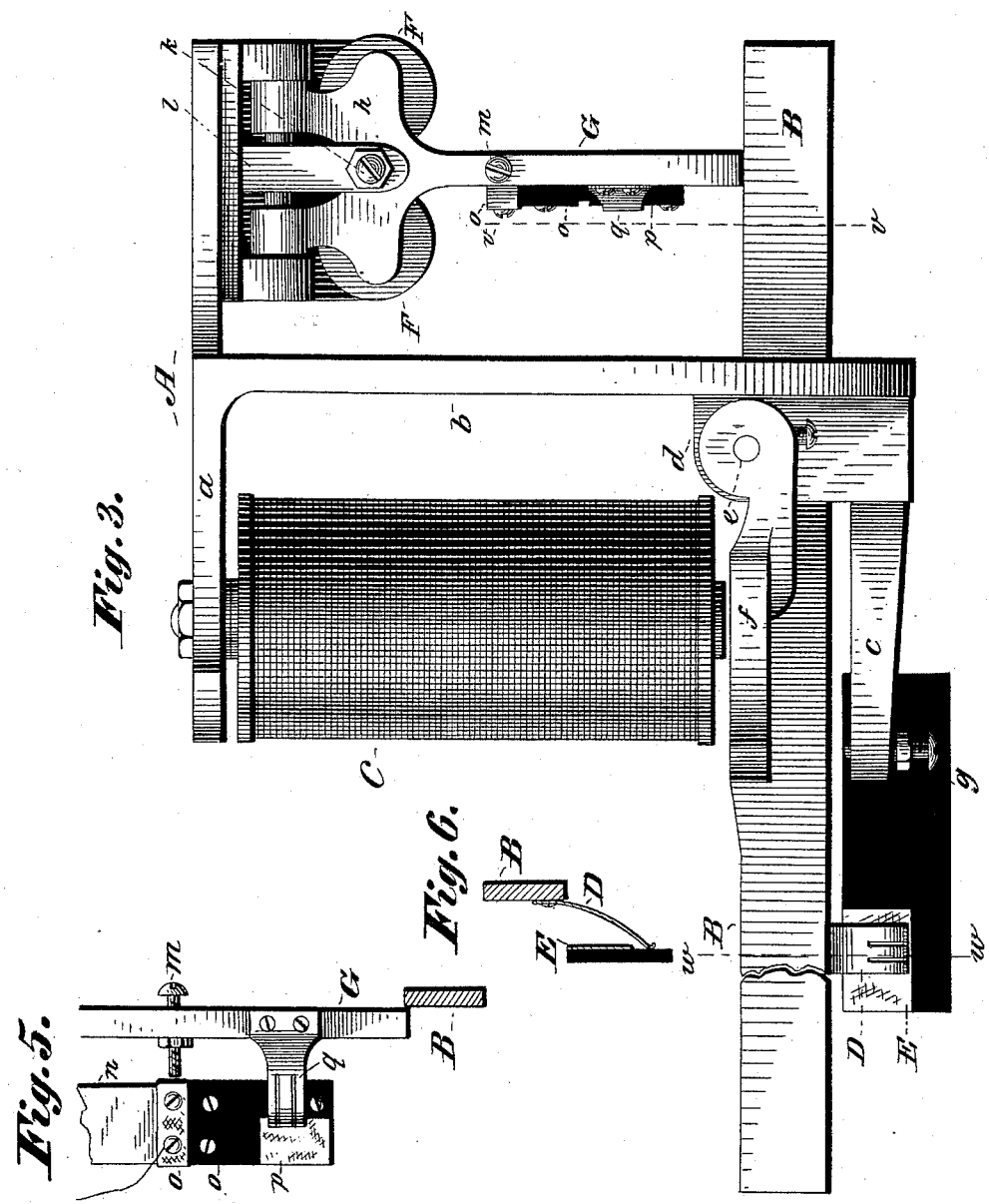
Witnesses:
Arthur Ashley
James F. Duhamel
Inventor:
John V. Stout (No Model.) 4 Sheets—Sheet 4.
J. V. STOUT.
ELECTRO MAGNETIC VALVE CONTROLLER.
No. 421,449. Patented Feb. 18, 1890.
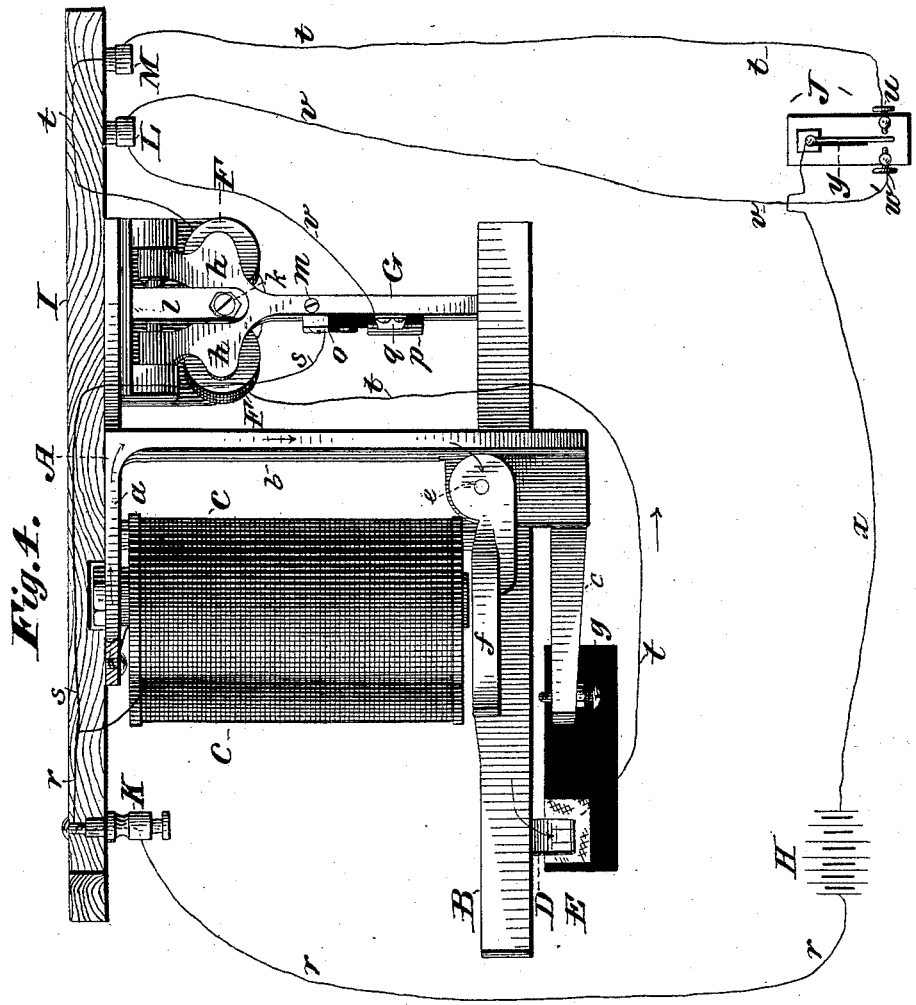
Witnesses:
Arthur Ashley
James F. Duhamel
Inventor:
John V. Stout
her J. H. Ashley atty.

UNITED STATES PATENT OFFICE.

JOHN V. STOUT, OF EASTON, PENNSYLVANIA.

ELECTRO-MAGNETIC VALVE-CONTROLLER.

SPECIFICATION forming part of Letters Patent No. 421,449, dated February 18, 1890.

Application filed November 15, 1889. Serial No. 330,379. (No model.)

*To all whom it may concern:*

Be it known that I, JOHN V. STOUT, a citizen of the United States, and a resident of the city of Easton, in the county of Northampton, in the State of Pennsylvania, have invented a new and useful Electro-Magnetic Temperature-Regulator, of which the following is a description.

The object of the invention is to provide an electrically-actuated apparatus, simple in its construction, noiseless in its operation, requiring no clock mechanism or other auxiliary power, operating automatically to maintain within an apartment for an indefinite period of time any desired and predetermined temperature.

My invention relates to that class of devices in which electro-magnets are employed to actuate a damper, valve, draft-door, or like device; and it consists in a novel construction and arrangement of parts, hereinafter explained, whereby cheapness and durability of construction are secured, together with efficiency of operation.

The apparatus is primarily designed for the automatic regulation or control of temperature in buildings or apartments, but may be advantageously employed to regulate or control a valve or like device in other connections, either in response to the action of a thermostat or upon the completion of the necessary electric circuit by manually-controlled devices.

Figure 1:
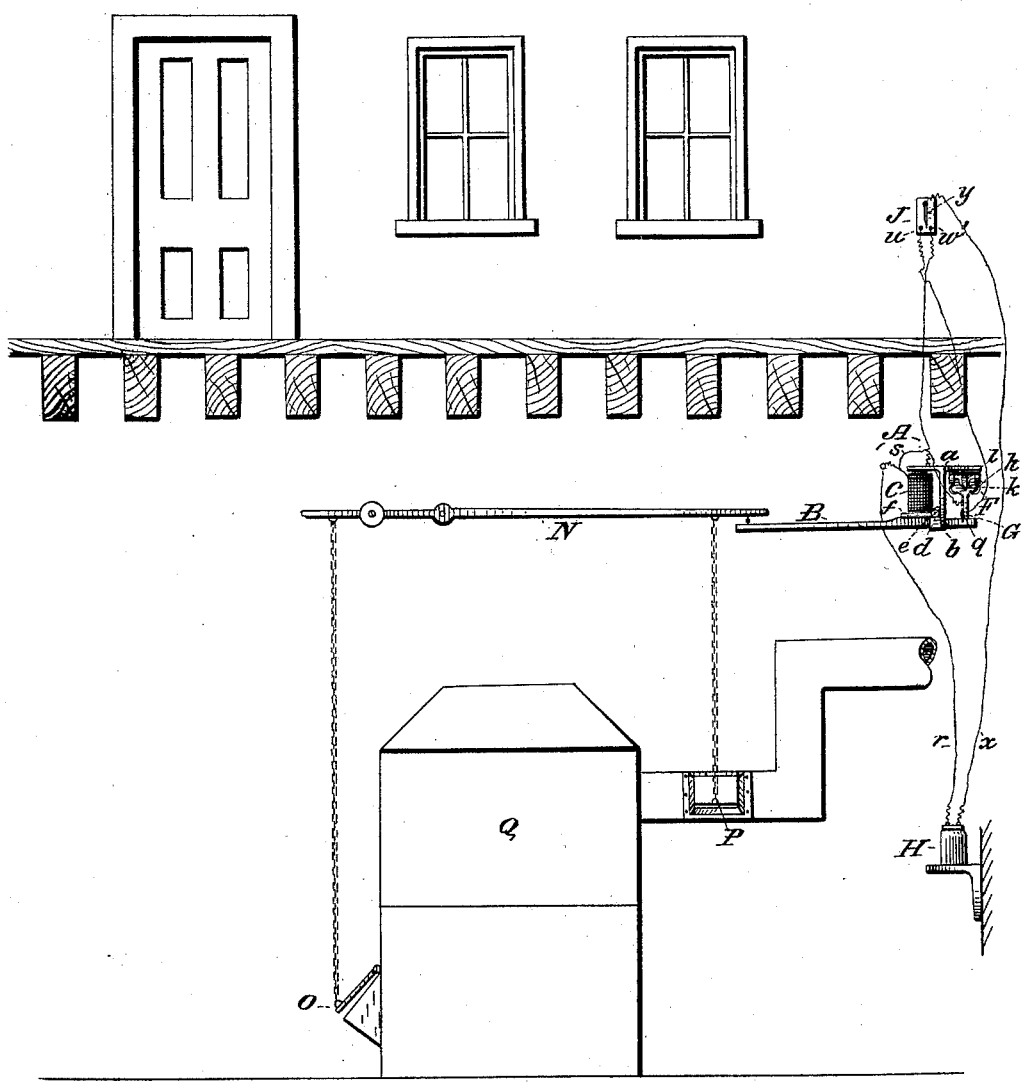
Figure 2:
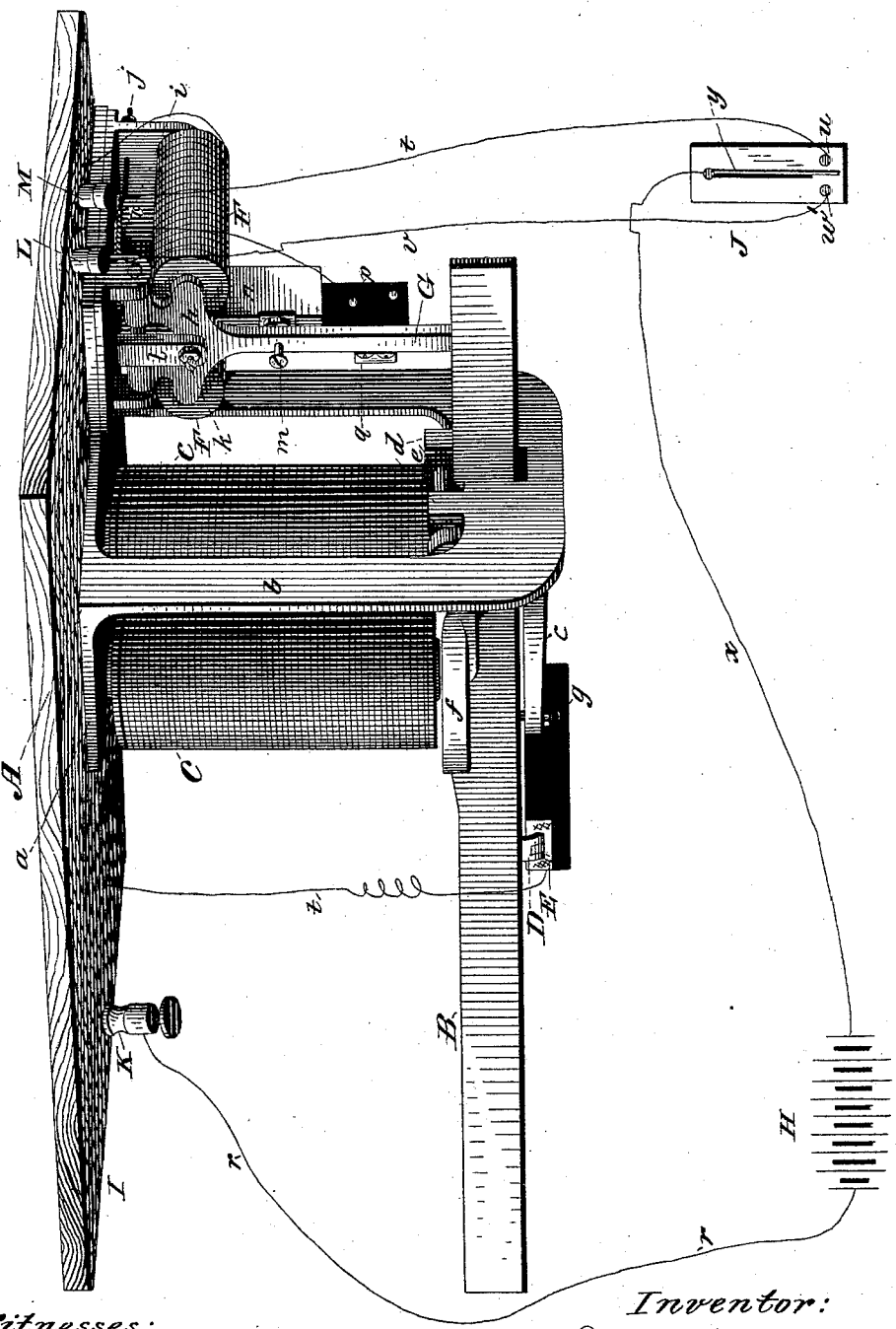

In the accompanying drawings, Figure 1 is an interior view of a building, showing my apparatus used in connection with a thermostatic circuit-closer for controlling the draft-door and check-valve of a furnace. Fig. 2 is a perspective view of the portion of the apparatus to which the present invention relates. Fig. 3 is a side elevation of the apparatus. Fig. 4 is a diagrammatic projection designed to illustrate the several circuits and connections. Figs. 5 and 6 are respectively vertical sections on the lines $v\ v$ and $w\ w$ in Fig. 3, the locking-lever being disengaged.

In the drawings, A indicates a frame, preferably made of cast-iron, and comprising a top plate $a$, and a U-shaped hanger $b$, depending from plate $a$ and provided midway between its depending arms with a forwardly-extending horizontal arm $c$ and with vertical lugs or ears $d$. The lugs $d$ are perforated to receive a pivot pin or rod $e$, upon which is mounted a lever B, conveniently made of cast-iron, and either formed or furnished with an armature $f$, which will advisably be of soft iron.

C C indicates two electro-magnet bobbins, the cores of which pass through plate $a$ of frame A, and are secured thereto by a nut screwed upon their threaded upper ends, above said plate. The lower ends or poles of the magnet-cores are arranged directly above and within a short distance of the armature $f$ of lever B, as shown in the several figures, and the play of lever B and the consequent separation of the armature and the poles of the magnet is limited and determined by a set-screw or stop-screw $g$, passing through arm $c$ of frame A and held against accidental turning by means of a jam-nut, as shown. By this arrangement the armature $f$ is precluded from moving out of the strong field of attraction of the magnet C.

Carried by the lever B in advance of its pivot is a contact spring or brush D, which, when the armature $f$ is attracted or otherwise held in close proximity to the poles of the magnet C, makes electrical contact with a plate E, carried by but insulated from the arm $c$ of the frame A. When the armature $f$ is not attracted, or when the lever B is not otherwise held up so as to keep the armature $f$ near the poles of the magnet C, it falls by reason of its weight, and in thus falling it carries the brush or spring D out of contact with the plate E.

F indicates a second electro-magnet, which may be materially smaller than the magnet C, because the work it has to perform is comparatively light.

The magnet F is preferably arranged in a horizontal position, as shown in Fig. 3, and its function is to attract the armature $h$ of a swinging stop or locking-lever G, which is hung upon a pivot-pin which passes through the lever and through lugs or ears which depend from plate $a$ of the frame A, as seen in Figs. 2, 3, and 4.

The lever G may be conveniently and advantageously made of cast-iron, but must in any event carry an armature $h$ and be of good conducting power, or provided with suitable conductors to complete the circuits, which will herein be described as completed through the lever itself.

Attached to lever G at a point above its pivot is a spiral spring $i$, the other end of which is attached to an adjusting-screw $j$, Fig. 2, by which screw the tension of the spring may be regulated or varied as desired. By drawing upon the upper end of the lever G the spring $i$ causes its lower end to swing away from the poles of electro-magnet F, and if the rear end of lever B be below the lower end of lever G such lever G will swing over and stand directly upon the rear end of lever B, thereby preventing the rise of such rear end and consequently preventing also the descent of the opposite end of the same. This is the normal position of the parts, and is illustrated in Figs. 2, 3, and 4.

The outward throw or movement of the lever G is limited and determined by a stop-screw $k$, which passes through an arm $l$, Figs. 2 and 3, and its inward movement is limited by a stop-screw $m$, which extends through the lever G, as shown in Figs. 2, 3, and 4, the screw $m$ serving, under certain circumstances, to complete a circuit, as presently explained. Carried by a depending arm $n$ are two insulated metallic contact plates or strips $o$ $p$, with the first of which electrical contact is made when and so long only as the armature $h$ is attracted by the electro-magnet F. With the plate or strip $p$ contact is made by the brush or spring $q$ whenever the armature $h$ is thus attracted by magnet F, and this contact is preserved until the main lever B is lifted through the action of magnet C, and until the lever G swings over and locks the lever B in its elevated position. The maintenance of the contact between the plate $p$ and the brush or spring $q$ until the lever G moves over and locks the lever B is necessary, in order to maintain the circuit through the magnet C, which elevates and holds up the lever B while the lever G is being thrown back to lock it.

Referring now to Fig. 4, the arrangement of the conductors and the different circuits or paths provided for the current under different conditions will be explained. Beginning at the battery or other source of electrical energy H a wire or conductor $r$ extends to and connects with one end of the coil of the electro-magnet C, the other end of which is in electrical connection with the metallic frame A. From the conductor $r$ a conducting-wire $s$ extends to the contact-plate $o$. A wire or conductor $t$ passes from the plate E to one end of the coil of the electro-magnet F and thence to the contact-point $u$ of a thermostat or circuit-closer J. From the contact-plate $p$ a wire or conductor $v$ passes to the second contact-point $w'$ of the thermostat or circuit-closer J. A conductor $x$ connects the metallic bar $y$ of the thermostat or circuit-closer J with the pole of the battery H opposite to that from which the wire or conductor $r$ extends.

In the drawings I have represented a common form of thermostatic circuit-closer, the bar $y$ of which is composed of a strip of steel or brass and a strip of hard rubber, which are riveted or otherwise firmly secured together; but this is merely for purposes of illustration, it being obvious that any equivalent device may be substituted. In some instances it may be found expedient to employ a manual switch or a push-button instead of depending upon variations of temperature to complete the circuits, and such manual switch may be represented by bar $y$, Fig. 4, assuming it to be pivoted instead of fixed at its upper end. So, too, various other changes may be made in the details of construction without departing at all from the spirit and scope of my invention. Thus the frame A and the levers B and G may be composed of wood or of other material, suitable conductors being provided to convey the current which is here described as passing through said parts, and soft-iron armatures $f$ and $h$ being in such case secured to the levers B and G. The positions of the parts may also be varied and any source of electrical energy may be employed, the battery H being merely represented as a type or form of generator suitable to the purpose. The circuits or connections being provided and arranged as above explained, the action of the apparatus is as follows, assuming that at the outset the parts occupy the positions indicated in Figs. 3 and 4, the fore end of lever B being elevated, and the locking-lever G standing over or in engagement with the rear end thereof: So long as the temperature continues within the limits for which the instrument is adjusted, commonly a range of from 3° to 5° Fahrenheit, the parts will remain in the position indicated, because the bar $y$ of the thermostat or circuit-closer J will not make contact with either the contact-point $u$ or the contact-point $w'$, and consequently no circuit can be completed. Assuming, now, that the temperature rises above the prescribed limits, the bar $y$ of the thermostat answering to such rise will make contact with point $u$ and a circuit will be established from battery H by conductor $r$ to and through the coils of electro-magnet C, thence to frame A, through said frame and through the pivot-pin of the lever B to and through said lever to the contact spring or brush D, which, under the adjustment assumed, will be in electrical contact with plate E, from said plate by conductor $t$ to and through the coils of the electro-magnet F, and by the continuation of conductor $t$ to the contact-point $u$. From the contact-point $u$ the circuit is completed through the bar $y$ of the thermostat or circuit-closer and through a wire or conductor $x$ back to the battery H. The circuit being thus completed through electro-magnets C and F, the magnet C immediately attracts the armature $f$ and lifts the forward end of the lever B, thereby carrying its rear end clear of the locking-lever G, which is then free to be drawn out of the path of the lever B through the attraction of its armature $h$ by the electro-magnet F. In thus moving out of the path of the lever B, or toward its own controlling-magnet F, the locking-lever G carries its contact-screw $m$ into contact with the plate or strip $o$ and its brush or spring $q$ into contact with plate $p$. When this occurs, a short circuit for the current is established, which omits the large electro-magnet C, but includes the smaller electro-magnet F, as will be seen by following the path of the current. Starting at battery H, the circuit will now be by conductors $r$ and $s$ to the contact plate or strip $o$, thence upward through contact-screw $m$ and lever G to frame A, through said frame and the pivot of lever B to and through said lever, thence by spring or brush D, plate E, and conductor $t$ to and through the coils of electro-magnet F, and by the continuation of conductor $t$ to the contact-point $u$ of the thermostat or circuit-closer J, whence it passes by bar $y$ and conductor $x$ back to the battery H. The electro-magnet C, being thus cut out of circuit or shunted, becomes inactive and permits lever B to fall by reason of its weight, and by so doing to carry the brush or spring D from off or out of contact with plate E, thereby breaking the circuit. The circuit will remain thus interrupted or incomplete, and there will consequently be no exhaustion or depletion of the battery until a new circuit is perfected by reason of the bar $y$ of the thermostat or circuit-closer J coming in contact with the contact-point $w'$ of said circuit-closer, which it will do whenever the temperature falls below the predetermined limit, or which may be effected manually, if desired. When the circuit is broken as last explained, the electro-magnet F, becoming inert, releases the armature $h$ and permits the locking-lever G to move back by reason of the tension of the spring $i$ until its lower end bears against the side of the then elevated rear end of the lever B, which precludes further movement of the locking-lever G. This backward movement of the lever G, though slight, is yet sufficient to destroy electrical contact between the screw $m$ and the plate or strip $o$, but is not enough to carry the brush or spring $q$ out of contact with the plate $p$, which latter is preferably a somewhat prolonged sliding contact, as stated above. The circuit is consequently interrupted between the screw $m$ and the plate $o$ immediately after the lever B falls and the magnet F becomes inactive. With the parts in the position thus described the following circuit will be established whenever the bar $y$ of the circuit-closer contacts with the point $w'$: from the battery H by conductor $r$ to and through the coils of electro-magnet C, thence to and through the frame A, through the locking-lever G and its brush or contact-spring $q$ to the plate $p$, thence by wire $v$ to the contact-point $w'$, from which point the circuit is completed through the bar $y$ and the conductor $x$ back to the battery H.

It will be observed that when the circuit is completed only the large electro-magnet C is included in the circuit, and being thus included and rendered active it attracts the armature $f$, elevates the forward end of the lever B, and depresses the rear end thereof. As soon as said rear end passes below the lower end of the locking-lever G, such lever G, being then unattracted by the magnet F, answers to the strain of the spring $i$ and swings over the rear end of the lever B, locking it against movement upward at the rear or downward at the forward end.

In rising to its original and normal position the lever B carries its spring or brush D again into contact with the plate E, and in swinging back to engage the lever B the locking-lever G carries its brush or spring $q$ out of contact with the plate $p$, thereby again breaking the circuit and restoring all parts to the positions first above assumed in explaining the action of the apparatus, so that upon the next undue rise of temperature the first-described action would be repeated.

It will be apparent from the above explanation that the battery-circuit is only completed at the moment when a change is to be effected in the adjustment or positions of parts, that said change takes place immediately, and that as the change is completed the battery-circuit is broken in every instance; hence the depletion of the battery will be exceedingly slow. In practice it is found that from four to six Leclanché or other open-circuit cells are sufficient to operate the device with absolute certainty.

For convenience of mounting and setting up my apparatus, I preferably secure the plate $a$ to a board I, and provide the latter with binding-posts K, L, and M, to receive the wires $r$, $t$, and $v$.

To facilitate variation of the limits of temperature at which the apparatus shall go into action, the contact-points $u$ and $w'$ may conveniently be made in the form of screws having milled heads passing through binding-posts, which receive the wires $t$ and $v$; but any other convenient and common plan may be adopted to this end.

In Fig. 1 I have represented the forward end of the lever B as connected with one end of a bar or lever N, pivoted at a point between its ends, and connected on opposite sides of its pivotal support with a draft-door O and a check-damper P for controlling combustion in a warm-air furnace Q.

Any usual or obvious mode of connecting the lever B with the valve, door, damper, or other device to be controlled may obviously be adopted.

The invention having been thus described, what is claimed is—

1. In an apparatus for actuating valves, dampers, and the like, the combination of a main lever, a locking-lever arranged to move into and out of the path of the main lever, to lock or release the same, armatures carried by said levers, and electro-magnets arranged within attracting distance of the armatures and serving to move the levers, substantially as set forth.

2. In an apparatus for actuating valves, dampers, and the like, the combination of a main actuating-lever provided with an armature, an electro-magnet located within attracting distance of the armature, a locking-lever movable into and out of the path of the main lever and provided with an armature, a second electro-magnet located within attracting distance of said armature and serving to withdraw the locking-lever from the path of the main lever, and a spring acting upon the locking-lever and serving to return it to the path of the main lever.

3. In an apparatus for controlling valves, dampers, and like devices, the combination, with a main lever and an actuating electro-magnet therefor, of a locking-lever adapted to hold the main lever in a given position, an electro-magnet for withdrawing the locking-lever and releasing the main lever, and circuit-closers carried by the locking-lever, whereby a short circuit is established to cut out the main-lever magnets when the locking-lever is withdrawn and the main lever is released.

4. In combination with a battery or source of electrical energy and with suitable conductors, a main lever B, and an electro-magnet C for lifting the same, a locking-lever G, and an electro-magnet for withdrawing said locking-lever, insulated contact-plates $o$ $p$, and contact-screw $m$ and brush or spring $q$, the former having merely a touching contact with plate $o$ and the latter having a sliding contact with plate $p$, whereby the contact is destroyed at $o$ upon a slight backward movement of lever G, while the contact continues at $q$ until the lever G is moved backward a greater distance.

5. The combination of a battery or other source of electrical energy and suitable conductors, a main lever, an electro-magnet for moving said lever, a locking-lever to hold the main lever, an electro-magnet for moving said locking-lever, a thermostat having two contact-points with which it makes electrical connection alternately as the temperature rises above or falls below predetermined limits, and circuit-closers or switches carried by the main and locking levers and serving to direct the current of electricity first through the two electro-magnets, and thereby to cause the withdrawal of the locking-lever and the release of the main lever, then to cut out the main-lever magnet, thereby permitting said lever to fall, and finally breaking the circuit, thereby rendering the locking-lever magnet inert and permitting the locking-lever to recede slightly from its controlling-magnet, and to establish a new path by which the current shall pass when the thermostat again closes the circuit.

JOHN V. STOUT.

Witnesses:
ARTHUR ASHLEY,
ADA ASHLEY.